(12) United States Patent
McJunkin, Jr. et al.

(10) Patent No.: US 7,364,179 B1
(45) Date of Patent: Apr. 29, 2008

(54) FRAME INTEGRAL SUSPENSION SYSTEM

(75) Inventors: Howard P. McJunkin, Jr., Wilmington, NC (US); Mark P. McJunkin, Atlanta, GA (US)

(73) Assignee: Product M, LLC, Atlanta, GA (US)

( * ) Notice: Subject to any disclaimer, the term of this patent is extended or adjusted under 35 U.S.C. 154(b) by 385 days.

(21) Appl. No.: 11/112,750

(22) Filed: Apr. 22, 2005

Related U.S. Application Data

(60) Provisional application No. 60/564,225, filed on Apr. 22, 2004.

(51) Int. Cl.
  *B62K 3/02* (2006.01)
  *B62K 25/30* (2006.01)
  *B62H 1/06* (2006.01)
(52) U.S. Cl. .................. 280/284; 280/283; 280/304
(58) Field of Classification Search ............... 280/284, 280/283, 304
  See application file for complete search history.

(56) References Cited

U.S. PATENT DOCUMENTS

| | | | | |
|---|---|---|---|---|
| 461,191 A | * | 10/1891 | Latta | 280/227 |
| 589,328 A | * | 8/1897 | Barton | 280/227 |
| 589,394 A | * | 8/1897 | Ohlgart | 280/227 |
| 602,354 A | * | 4/1898 | Ohlgart | 280/227 |
| 635,964 A | * | 10/1899 | Horn | 280/227 |
| 1,573,849 A | * | 2/1926 | Nagot | 280/227 |
| 4,881,750 A | * | 11/1989 | Hartmann | 280/276 |
| 5,553,880 A | | 9/1996 | McJunkin et al. | |
| 5,947,498 A | * | 9/1999 | Rajaee | 280/276 |
| 6,309,135 B1 | | 10/2001 | Thomson et al. | |
| 6,708,582 B1 | | 3/2004 | McJunkin et al. | |
| 6,837,507 B1 | | 1/2005 | McJunkin | |

\* cited by examiner

*Primary Examiner*—Lesley D. Morris
*Assistant Examiner*—Marlon Arce-Diaz
(74) *Attorney, Agent, or Firm*—James Creighton Wray; Clifford D. Hyra

(57) ABSTRACT

A suspension system that requires minimal or no welding and can be easily adapted for use with a variety of frame configurations without adversely affecting the frame integrity. One embodiment includes a top bearing (21), a base bearing (31), an upper clamp (19), and a strut (41). The bearing inserts may be secured with conventional fastening means, for example, adhesives or screws. In one embodiment, a lower spring seat may be secured with a snap ring and heat sensitive materials may be used. Thus, the suspension systems may, if welding is necessary, be installed using standard frame welding practice without the need for extraordinary or special fixtures or procedures. Options are thus now available in component material selection and suspension configuration which have previously been limited because of the heat of welding. This frame integral technology may be used with only minor changes to current fabrication practices.

20 Claims, 18 Drawing Sheets

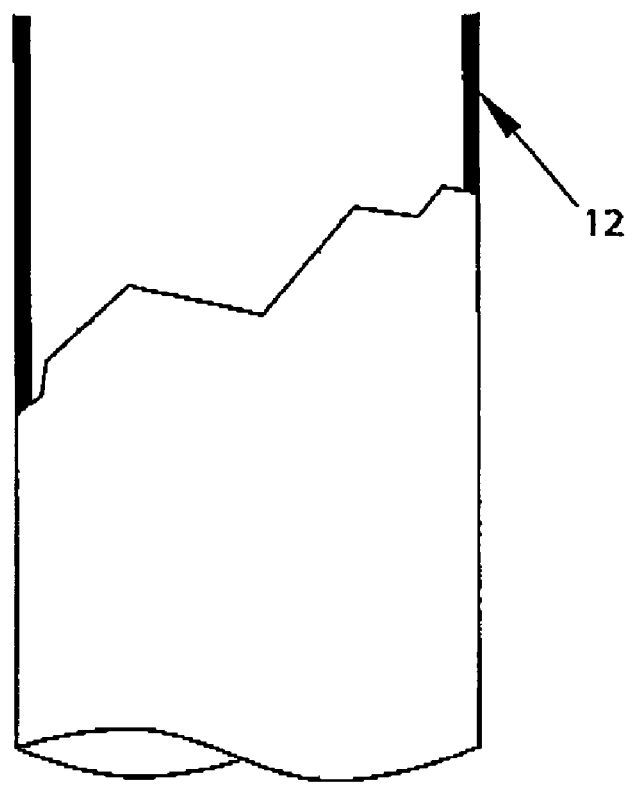
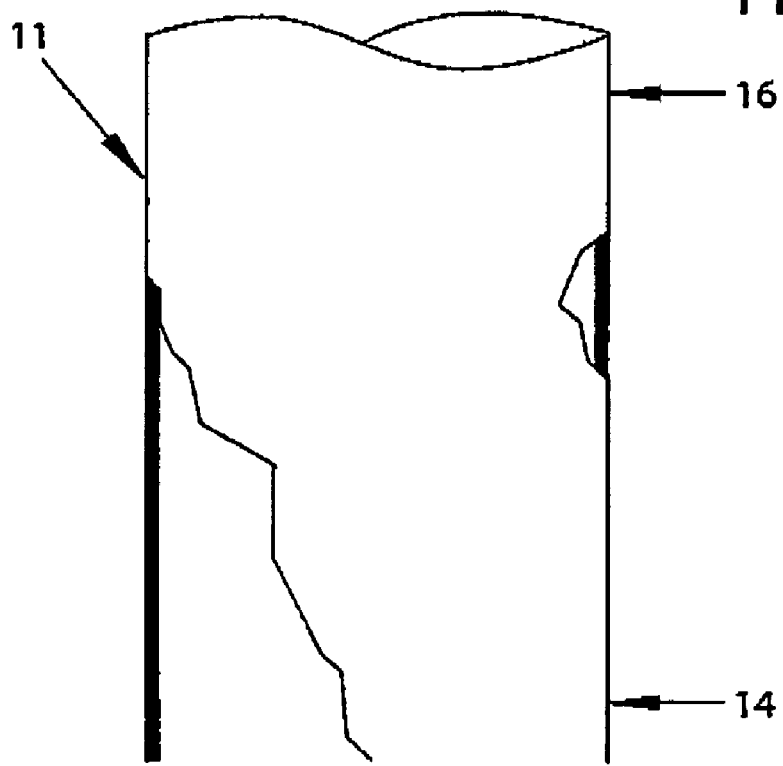
FIG. 2

FRAME INTEGRAL SUSPENSION SYSTEM

PRIORITY CLAIM

This application claims the priority of Provisional Patent Application Ser. No. 60/564,225 filed Apr. 22, 2004.

BACKGROUND OF THE INVENTION

1. Field of the Invention

The present invention relates to suspension systems and, more particularly, to a suspension system which is useful in a variety of bicycle frame configurations without compromising the integrity of the bicycle frame, without requiring substantial additional or special welding processes, and without requiring the use of special, heat resistant materials.

2. Description of the Related Art

Bicycle frames, when manufactured, are generally true and the bores are straight and smooth. However, some suspension systems require welding, the heat of which can distort the frame and/or distort the materials used in the suspension system. Further, distortion caused by conventional welding procedures can destroy close tolerances. In addition, the heat of welding precludes use of many desirable materials in the suspension system. Other suspension systems require that the frame be cut apart, the suspension system inserted, and then the frame reassembled using various techniques such as welding, screws, brackets, etc. To avoid these problems, costly fixtures, special welding procedures, subsequent straightening procedures, and/or special heat-resistant materials have been used. All of these add cost and/or complexity to the process of fabricating the end product, a bicycle and can even compromise the integrity of the frame.

In addition, a conventional suspension system designed for a particular frame configuration is often not usable with a modified or different frame configuration.

Therefore, there is a need for a suspension system which does not require welding or minimizes the requirement for welding, which preserves the integrity of the frame, which can be easily used with a variety of frame configurations, which does not require special processes and fixtures, which does not require the use of heat-resistant materials, and which can be easily adapted for use with a variety of frame configurations.

SUMMARY OF THE INVENTION

One embodiment of a suspension system includes a strut having a lower section and an upper section, the lower section of the strut generally being an elongate tube having a receiver at the distal end thereof, the upper section of the strut being a elongate tube, the lower section of the strut tapering inwardly, at its upper end, to the lower end of the upper section of the strut, at least part of the strut sliding axially within an elongate strut tube on a common centerline with the elongate strut tube. The embodiment also includes a top bearing having a throat and a flange, the throat fitting inside the upper section of the elongate strut tube, the flange resting on the end of the upper section of the elongate strut tube, the top bearing being secured to the elongate strut tube, and a base bearing having a throat and a flange, the throat fitting inside the lower section of the strut, the flange abutting the lower end of the lower section of the strut, the base bearing being secured to the strut.

Another embodiment of a suspension system includes a strut generally being an elongate tube having a receiver at the lower end thereof and a groove at the upper end thereof, the strut tapering inwardly at its upper end. The embodiment also includes a top bearing fitting at least partially within the upper section of an elongate strut tube, the top bearing being secured to the elongate strut tube, an index block fitting inside the lower section of the elongate strut tube and being secured to the elongate strut tube, at least part of the strut sliding axially within, and on a common centerline with, the base bearing, the elongate strut tube, and the top bearing, a clamp for receiving the top end of the strut, and a snap ring fitting in the groove to prevent the strut from withdrawing from the clamp.

Another embodiment of a suspension system includes a strut, generally being an elongate tube having a receiver at the lower end thereof and a groove at the upper end thereof, the strut tapering inwardly at its upper end. This embodiment also includes a top bearing having a throat and a flange, the throat fitting inside the upper section of an elongate strut tube, the flange resting on the end of the upper section, the top bearing being secured to the elongate strut tube, a base bearing having a throat and a flange, the throat fitting inside the lower section of the strut, the flange abutting the lower end of the lower section, the base bearing being secured to the strut, at least part of the strut sliding axially within, and on a common centerline with, the base bearing, the elongate strut tube, and the top bearing, a clamp for receiving the top end of the strut, and a snap ring fitting in the groove to prevent the strut from withdrawing from the clamp.

BRIEF DESCRIPTION OF THE DRAWINGS

FIG. 2 is a foreshortened cross-sectional detail of the strut housing frame seat/strut tube.

DETAILED DESCRIPTION OF THE DRAWINGS

Figure 1:
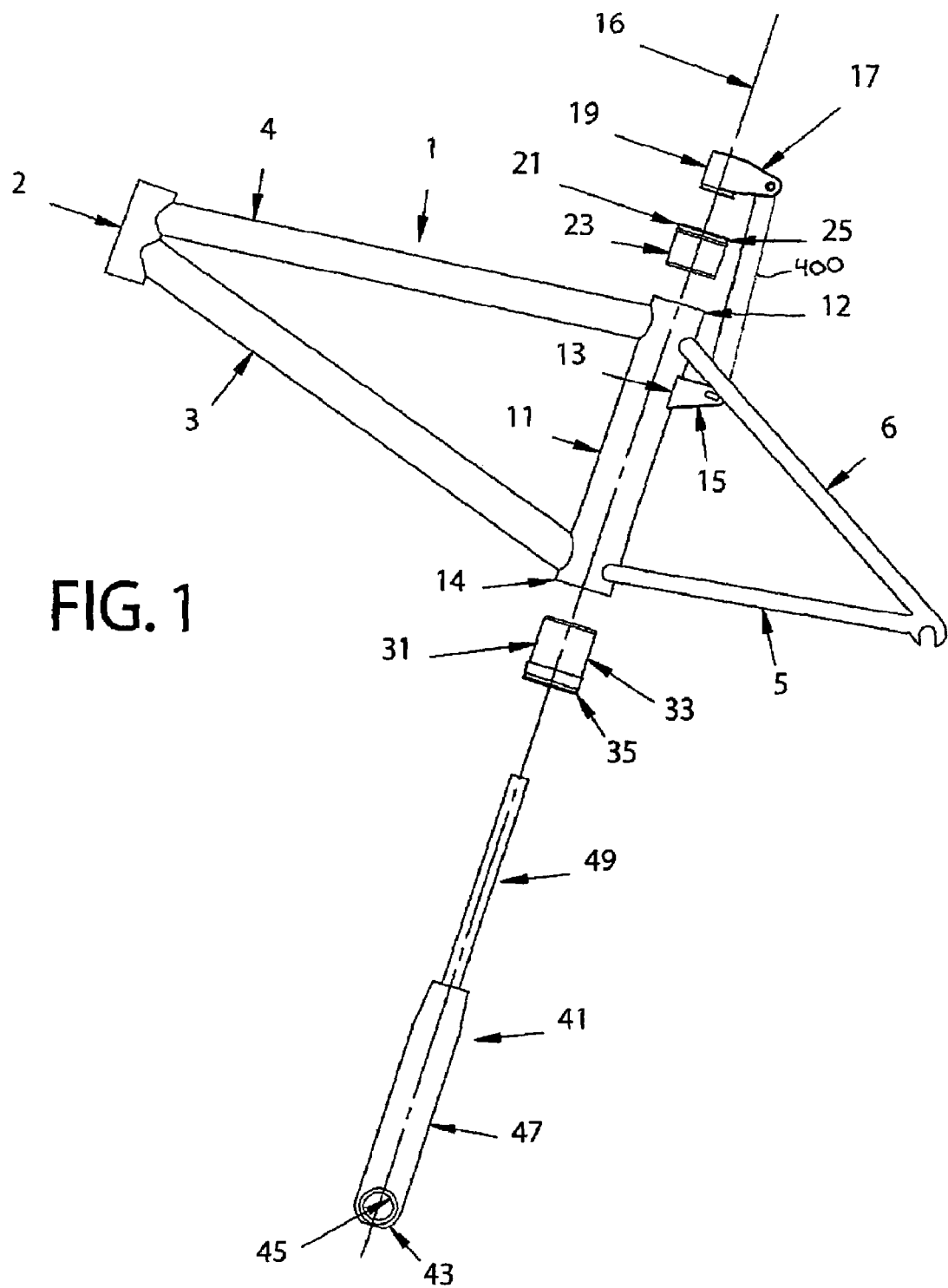
FIG. 1 is an exploded view of a bicycle frame, strut, and bearings.
Figure 3:
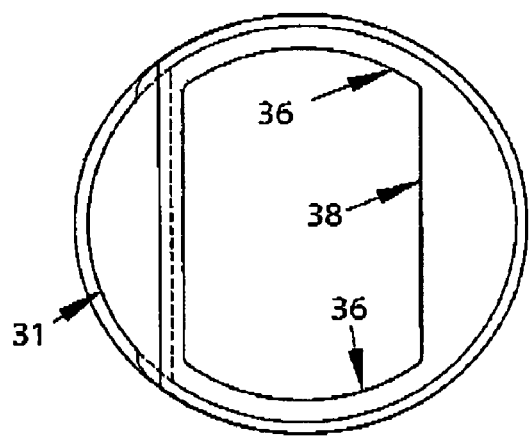
FIG. 3 is a bottom view of the base bearing.
Figure 4:
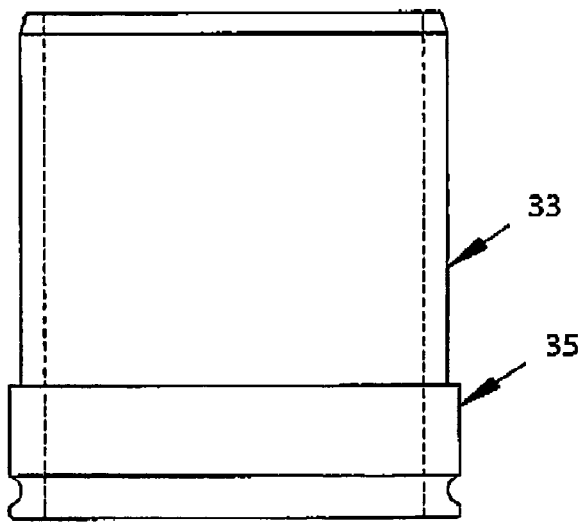
FIG. 4 is a side view of the base bearing.
Figure 5:
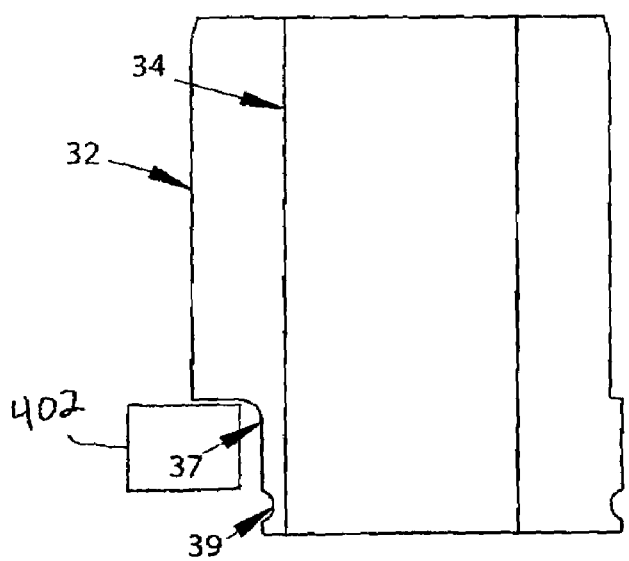
FIG. 5 is a cross-sectional detail of the base bearing.
Figure 6:
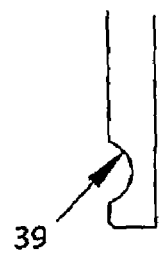
FIG. 6 is a cross-sectional detail of a boot connector on the bottom of the base bearing.

Referring to the drawings, FIG. 1 shows a conventional bicycle frame 1 with a steer tube 2, a down tube 3, a top tube 4, chain stays 5 and seat stays 6, and with a strut housing seat/strut tube 11. FIG. 1 also shows the suspension system, generally comprising a top bearing 21, a base bearing 31, an upper clamp 19, and a strut 41.

In one embodiment, a bracket 15 is welded on the seat/strut tube 11. A complementary bracket 17 extends from an upper clamp 19. These brackets hold an air or coil spring 400 between them. Other spring means may be used.

A top bearing 21 has a throat 23 which fits inside an upper end 12 of the seat/strut tube 11, and a flange 25 that rests on the top of the seat/strut tube.

A base bearing 31 has a throat 33 which fits inside the lower end 14 of seat/strut tube 11, and a flange 35 that abuts the lower end of the seat/strut tube.

In some prior art suspension systems, the bearings were welded into the tube 11, which created the problems mentioned above. However, in the preferred embodiment, the bearings are preferably press fit and/or bonded to the seat/strut tube with industrial adhesive. Screws may also be used instead of or in addition to the press fit and/or adhesive. This avoids the problems of the prior art and also allows the use of materials for the bearings which are not heat resistant, thereby expanding the choices of materials for the bearings and providing the opportunity to use lower cost materials for the bearings.

A strut 41 slides axially on a common centerline 16 with the strut housing seat/strut tube 11 within limits and forces imposed by the spring means mounted between the brackets 15 and 17.

The strut 41 has a lower T-shaped end 43 with a cylindrical receiver 45 for bearings to hold a pedal crank axle.

A lower section 47 of the strut 41 has a flatted round cross-section. An upper section 49 of the strut 41 is a tube which is secured in the top of the lower strut section 47, such as by press fitting, bonding, and/or pinning.

In FIG. 2 the strut housing seat/strut tube 11 has relatively thick upper and lower ends 12 and 14 and a thinner medial section 16. Lower end 19 is larger and thicker than upper end 12 to accommodate stresses and the larger base bearing 31. Where wall thickness is not a priority, wall thickness may be uniform.

FIGS. 3-6 show the base bearing 31, its throat 33 and base flange 35. The right side of flange 35 is recessed 37 to accommodate gears and chain links 402.

A peripheral groove 39 holds the upper end of a lower boot, not shown. The center 32 of the solid bearing has a through opening 34 which has front and rear radiuses 36 and flat walls 38 to guide the flatted round lower section 47 of strut 41.

Figure 7:
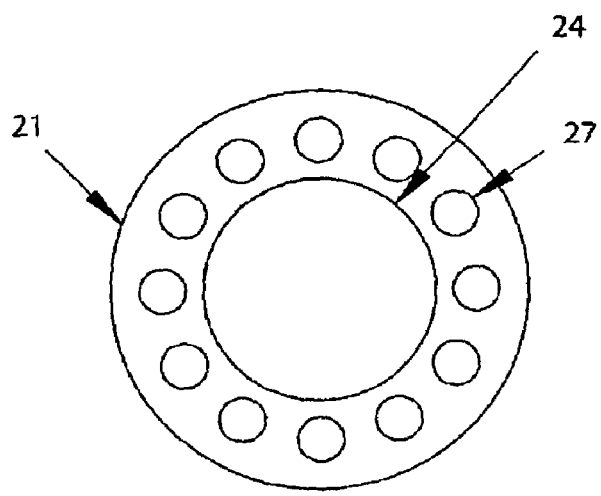
FIG. 7 is a top view of the top bearing.
Figure 8:
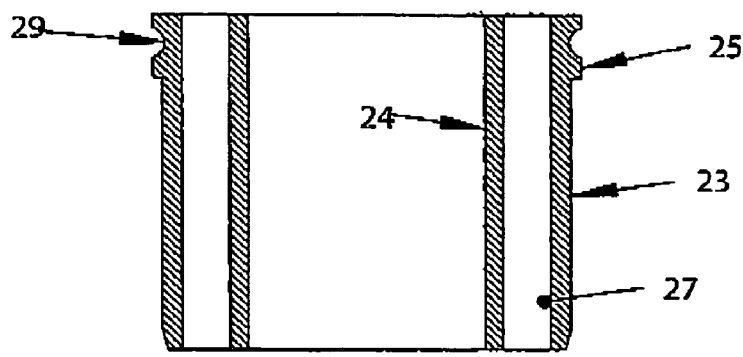
FIG. 8 is cross-sectional elevation of the top bearing.
Figure 9:
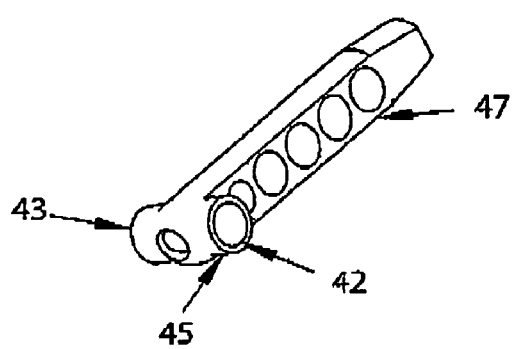
FIG. 9 is a perspective view of the lower strut.
Figure 10:
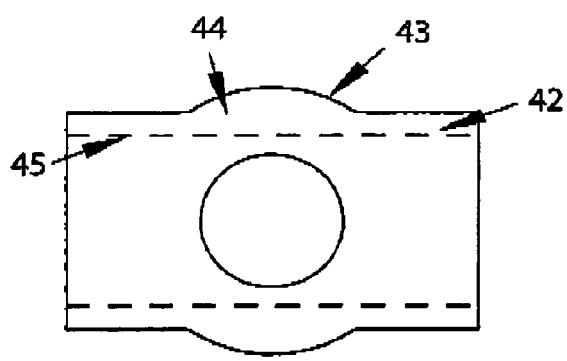
FIG. 10 is a bottom view of the lower strut.
Figure 11:
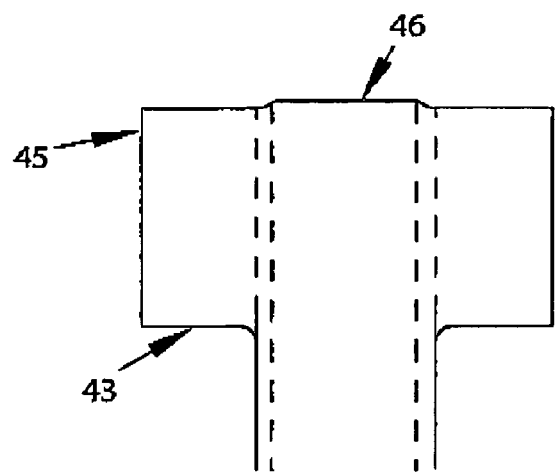
FIG. 11 is a rear view detail of the lower strut base.
Figure 12:
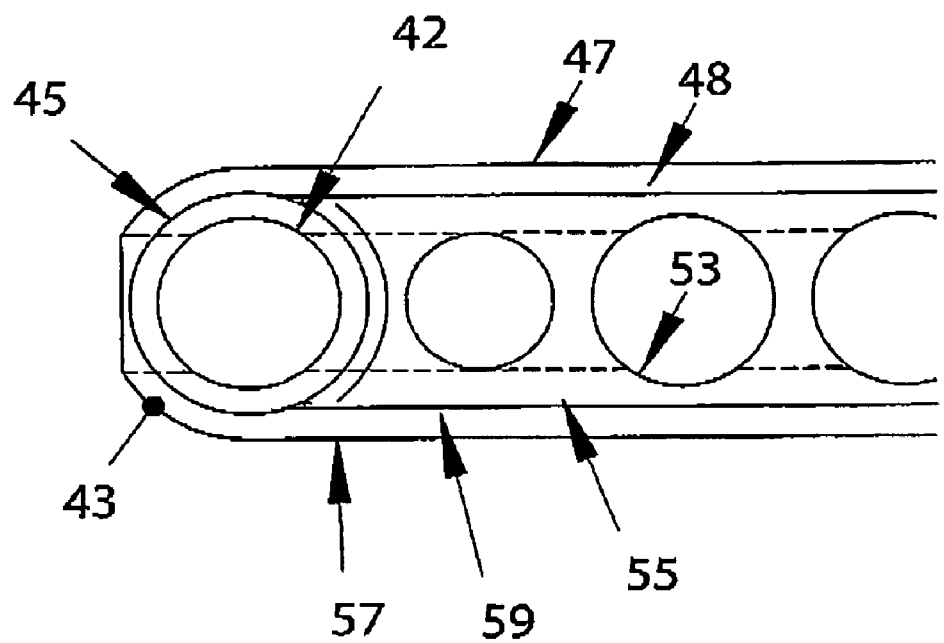
FIGS. 12 and 13 are partial side elevations of the lower strut base.
Figure 13:
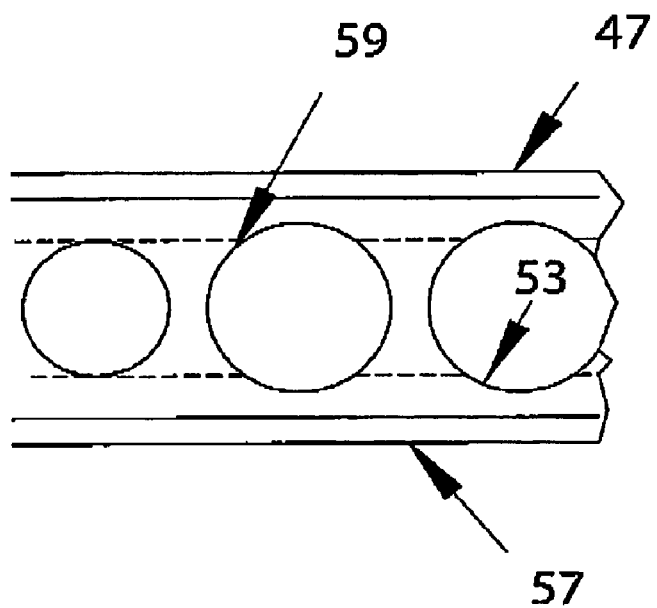
Figure 14:
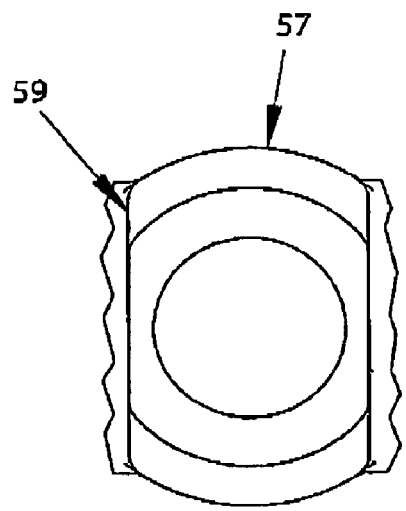
FIG. 14 is a cross-section of the lower strut base.
Figure 15:
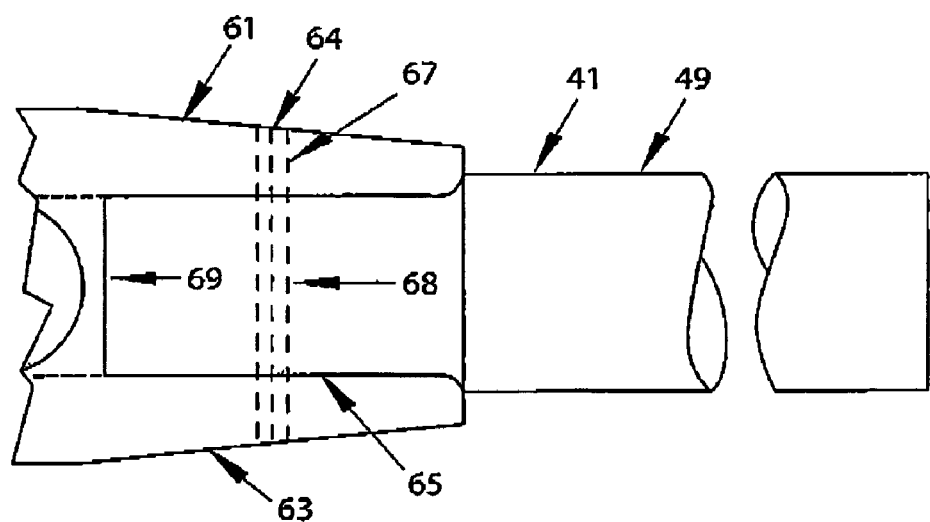
FIG. 15 is a side elevation detail of the top lower strut base and its connection to the upper strut tube.

FIGS. 7 and 8 show the top bearing 21, throat 23 and flange 25. A groove 29 holds a lower end of an upper boot, not shown. The upper end of the upper boot is held in a lower groove in clamp 19. Parallel evenly spaced holes 27 lighten the bearing. The central through opening 24 is cylindrical for sliding the upper section 49 of the strut 41.

FIGS. 9-15 show details of the lower end 47 of the strut 41. T-shaped end 43 has threaded ends 42 of a cylindrical receiver 45 for mounting bearings for a crank axle. A spherical central portion 44 has a flat base 46. The main central portion 48 of the lower portion has a round-flat beam construction 51 with weight-reducing holes 53 in the web 55, and also has radiuses 57 on the flanges and flat surfaces 59 for guiding the lower section 47 in conjunction with surfaces 36 and 38 of the base bearing 31.

The upper end 61 of the strut lower section 46 tapers 63 inwardly and has a central longitudinal bore 65 to receive the lower end 69 of the strut upper section 49. The lower end has a transverse hole 68 for aligning with hole 67 through the bore 65 for insertion of a roll pin 64 after press fitting and bonding the end 69 of the strut upper section 49 in the bore 65 of the strut lower section 47.

Figure 16:
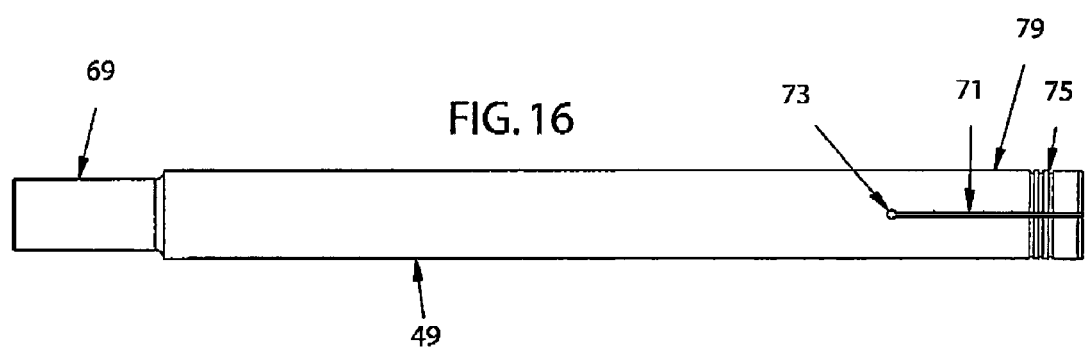
FIG. 16 is a foreshortened cross-section of the upper strut tube.

FIG. 16 shows the upper strut section 49 that has the lower end 69 for insertion in the axial bore in the upper end of the strut lower section.

A slot 71 with a rounded stop 73 allows the compressing of the upper end 79 of tube 49 on a seat post, not shown. A snap ring groove 75 at the upper end of the tube engages a snap ring (not shown) in an internal groove (not shown) in clamp 19 to prevent sliding of the clamp along the upper end 79 of the strut tube 49. Additional snap ring grooves can be provided for static height adjustments.

Figure 17:
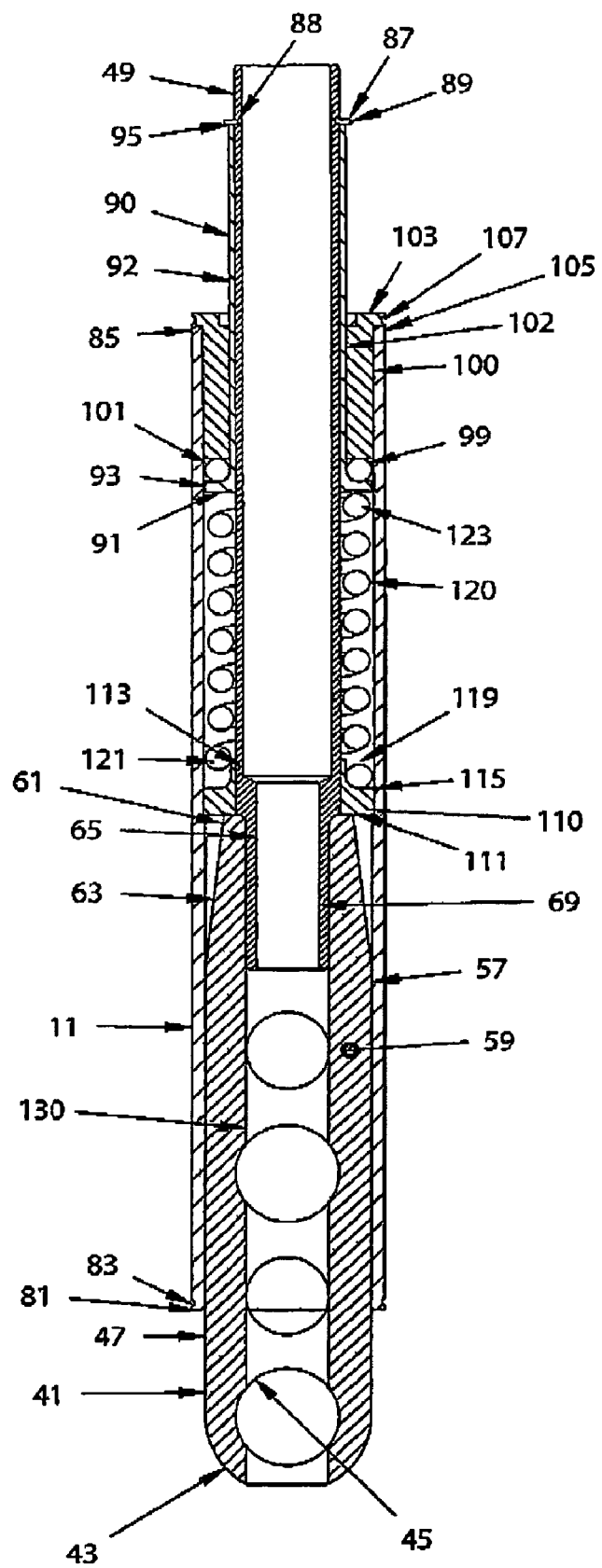
FIG. 17 is a cross-section of a preferred seat/strut tube, index blocks, upper bearing, spring seats, and a spring with a strut shown in elevation.

FIG. 17 shows a reciprocating strut 41 with a lower end 43 having a receiver 45 for holding crank axle bearings.

Figure 18:
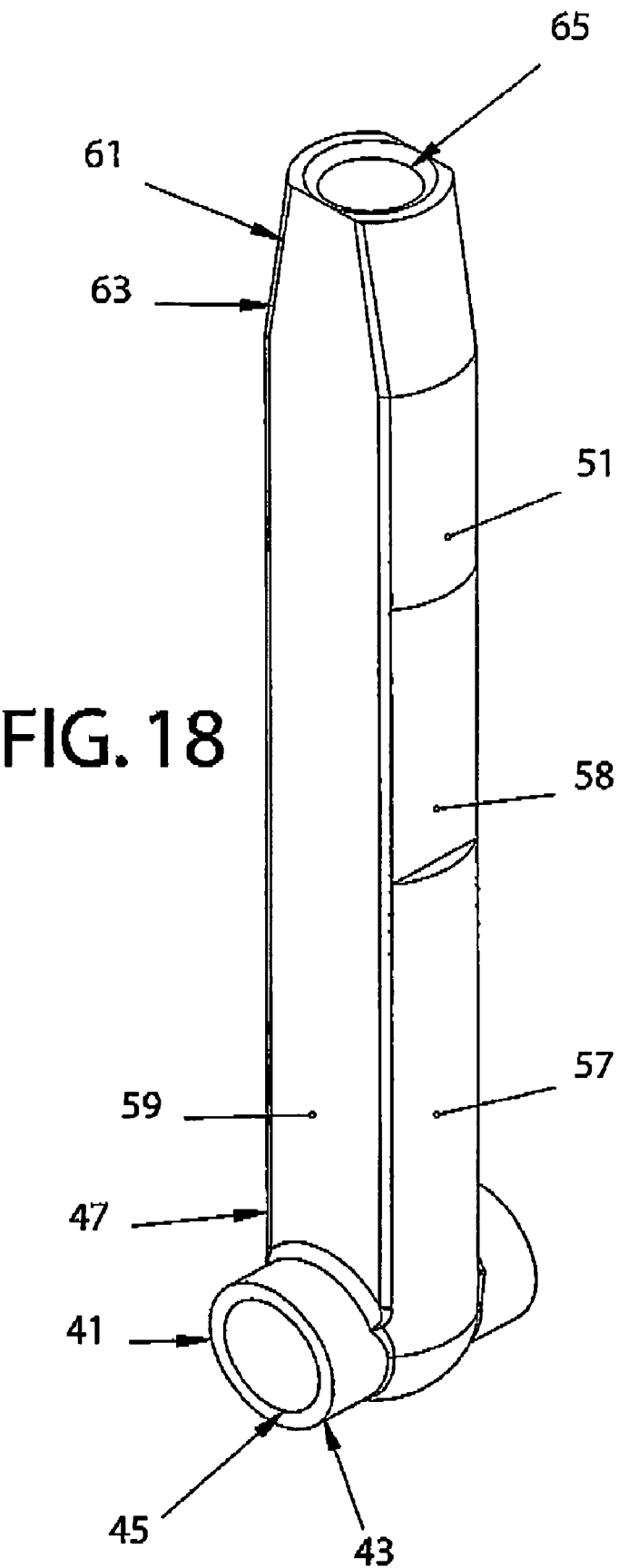
FIG. 18 is a perspective view of a lower section of the strut.

The lower end portion 47 of the strut 41 has opposite flat surfaces 59 for engaging flat surfaces of indexing blocks 130 (FIG. 19) to prevent strut rotation in seat/strut tube 11. Round radiused surfaces 57 move along the inside of seat/strut tube 11. Reliefs 58 (FIG. 18) in the radiused surfaces 57 reduce friction if needed.

Preferred seat/strut tube 11 has a lower end 81 with a groove 83 for holding a lower mud skirt retainer. An upper end 85 is preferably flat.

A groove 88 in the upper section 49 of strut 41 receives a snap ring 87 to engage the upper end 95 of the inner bearing and upper spring seat 90. An O-ring cushion 89 surrounds the upper end 95 of the upper spring seat.

The inner bearing and upper spring seat 90 has a smooth bearing surface 92. A lower end 91 has a radial collar 93. The lower end 91 is the seat for the upper end 123 of spring 120. A rebound cushion 99 is inserted between lower flange 93 of the upper spring seat 90 and the lower end 101 of upper bearing 100.

Upper bearing 100 has an upper flange 103 with a lower surface 105 that abuts the upper end 85 of seat/strut tube 11. A groove 107 receives an upper mud skirt retainer. The upper bearing 100 is preferably press fit or bonded, or both, inside the upper end 85 of seat/strut tube 11.

Lower spring seat 110 is secured to an intermediate inner surface of strut 11, near the lower end of the upper strut section 49 in its at rest position. The upper strut section slides within inner face 113 of the lower spring seat 110. Flange 111 has a grooved upper face 115 that holds a jounce cushion 119 for supporting the lower end 121 of spring 120.

As mentioned, snap ring 87 fits in a groove 88 in upper strut tube 49 and secures upper spring seat 90 to strut 41. Removal of snap ring 87 and upper bearing 100 provides for disassembly. An additional or alternative jounce cushion 89 may be deployed between the snap ring 87 and the top surface 103 of the upper bearing 100.

The spring seat 90 outer surface 92 must be smooth as required to move in inner surface 102 of upper bearing 100.

The durometer specifications and final dimensions of the rebound cushion are best determined empirically by prototype test and evaluation.

The upper bearing 100 has dimensions as required to accommodate the spring seat 90. A through hole or holes are provided from top surface to bottom of the bearing for pressure venting. The bearing 100 may be secured in the seat/strut tube with a set screw, a through screw or threads, depending on wall thicknesses and costs.

The spring 120 preferably has a free length of about 3.50 inches, a collapsed length of about 2.00 inches, and a spring rate of approximately 205 lbs/inch, and has flat and ground ends. Rates may be adjusted as test and evaluation results indicate.

The lower spring seat 110 is secured in the seat/strut tube 11 with screws, adhesives or other means, including stepped bores.

In less expensive bicycles, weight, sophistication in damping adjustability and high performance are not the critical considerations they are in a high-end bicycle. Additional flexibility may be provided as shown in the general arrangement of FIG. 17.

Some spring 120 and jounce cushion 119 preloading may be provided at the time of assembly by dimensional adjustments of related parts and cushion 119 construction. Preload could be slight but effective. For example, the upper cushion 99 compressed by the spring force in effect reduces the net spring rate near the top of the stroke only. Actual test riding can optimize final construction.

Figure 19:
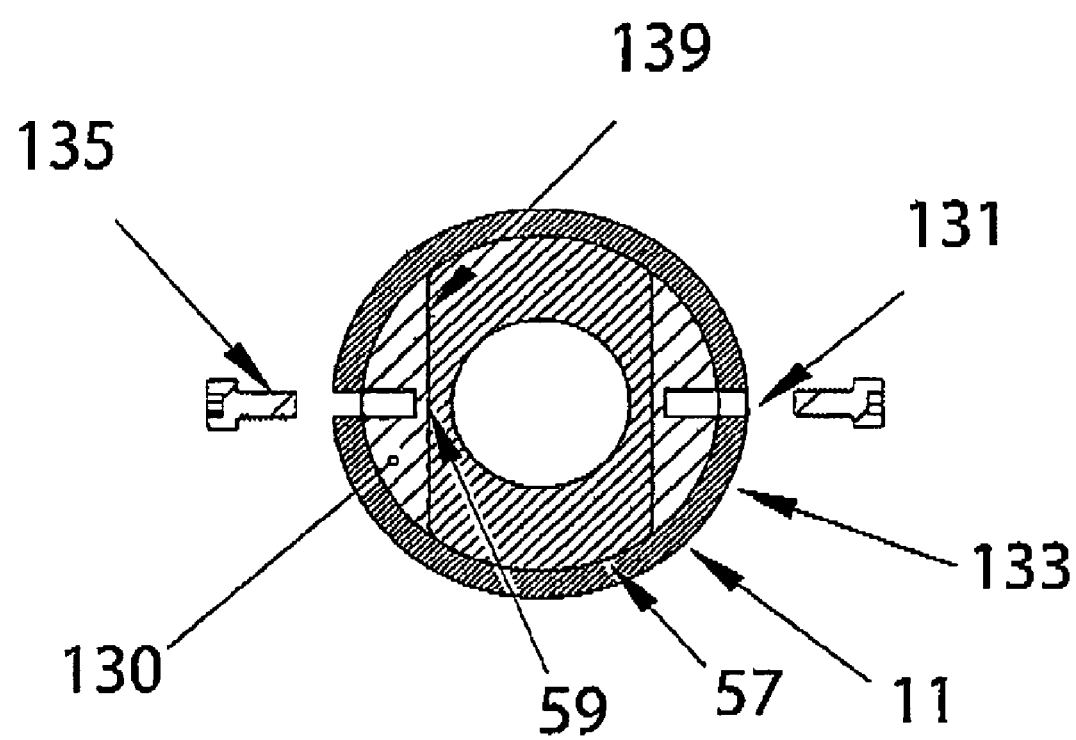
FIG. 19 is a cross-section of flat index blocks in the seat tube threaded for receiving pins after bonding.
Figure 20:
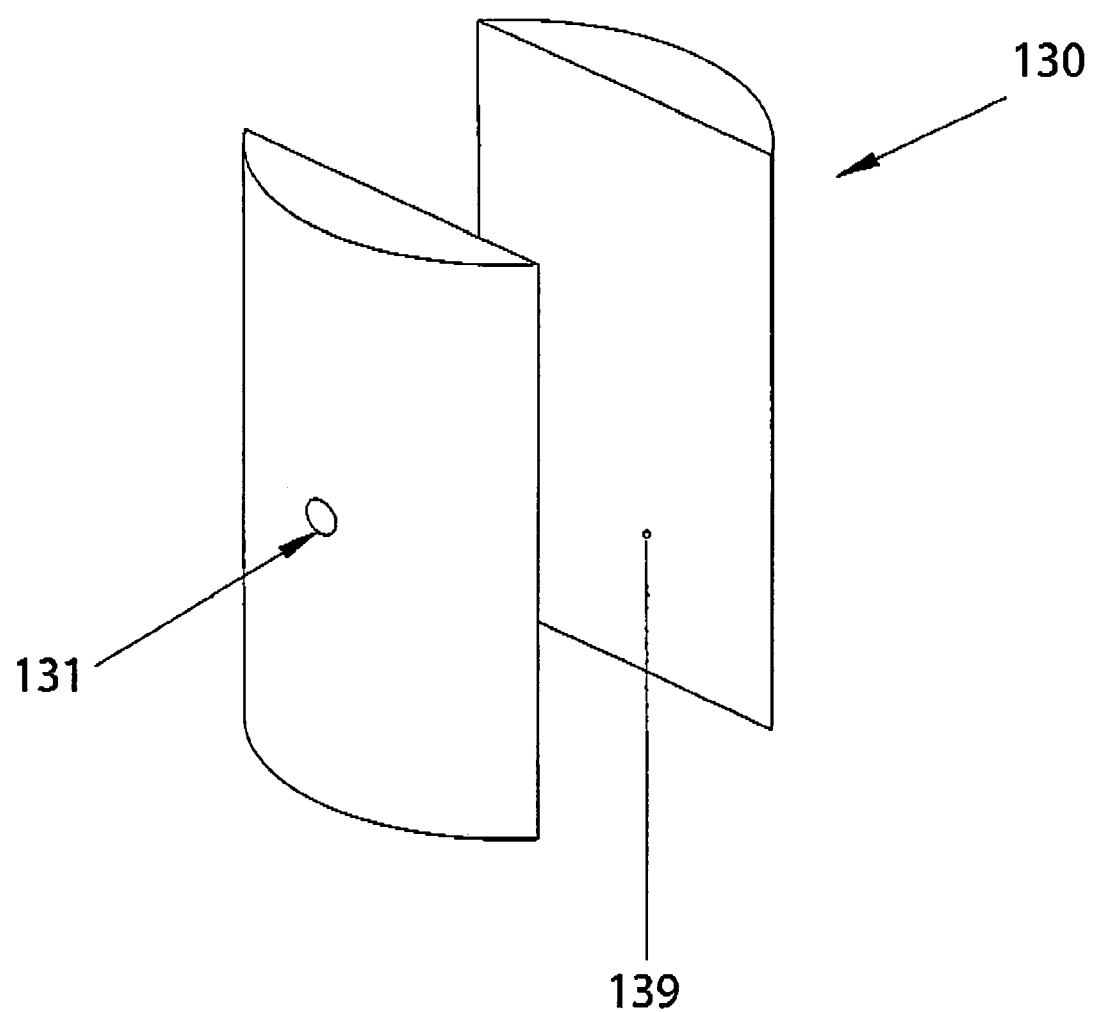
FIG. 20 is a perspective detail of the flat index blocks.

As shown in FIGS. 19-20, partially round index blocks 130 are secured in the bottom of the seat/strut tube 11. Index blocks 130 are preferably bonded and bolted on the inside of the lower end 14 of seat/strut tube 11. After bonding, holes 131 are bored from the outside through the rounded surfaces 133 and walls of the seat/strut tube 11. Screws 135 are then fixed in the holes 131. The opposite flat surfaces 59 of the lower strut section slide on flat inward surfaces 139 of partially round index blocks 130.

Use of partially round index blocks 130 reduces costs as the seat/strut tube 11 can be easily bored or smoothed to sufficient surface finish and concentricity after any necessary welding. More generous tolerances generally help in the manufacture of moderate cost bicycles.

In one frame configuration (not shown), a single front monotube replaces top tube 4 and the down tube 3. To eliminate seat/strut tube deflection where it joins the front monotube, a combination of reinforcing pad and tube wall thickness may be used.

Figure 21:
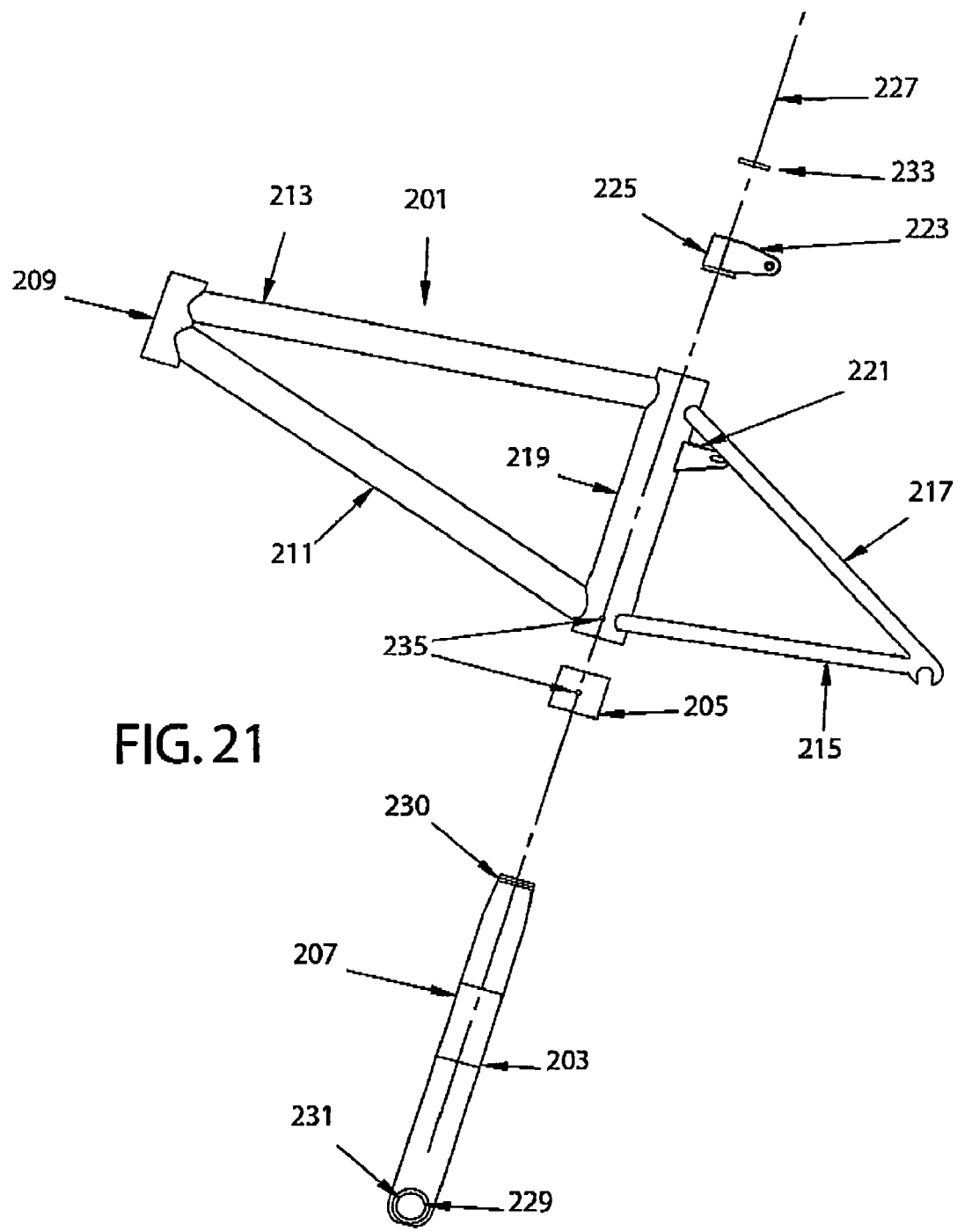
FIG. 21 is an exploded view of a bicycle frame and strut with index blocks.

FIG. 21 is an exploded view of a bicycle frame 201 and strut 203 with index blocks 205. This embodiment shows an elongated unitary strut 207 and index blocks 205. This eliminates two-part strut assemblies and bearing inserts, thereby reducing costs and providing more options for use in different bicycle frame assemblies. The elongated strut base 207 is used where a relatively thin walled housing tube is used in order to minimize weight. The bicycle frame 201 has a fork tube 209, a down tube 211, a top tube 213, chain stays 215 and seat stays 217, and a new strut housing seat/strut tube 219. A bracket 221 is welded on the seat/strut tube 219. A complementary bracket 223 extends from an upper clamp 225. There is no need for a top bearing or a base bearing in this embodiment.

The strut 203 slides axially on a common centerline 227 within the strut housing seat/strut tube 209 within limits and forces imposed by an air spring (not shown) mounted between the brackets 221 and 223. The strut 203 has a lower T-shaped end 231 with a cylindrical receiver 229 for bearings to hold a pedal crank axle. To reduce machining cost, receiver 229 may be welded to strut 203.

A snap ring 233 fits groove 230 in top of strut 203. The clamp 225 is larger to complement the top of the longer strut base 207. Screw holes 235 are located in the base of the strut housing seat/strut tube 219 and in the index blocks 205. Two index blocks 205 are installed in the frame seat tube 219 after frame welding and machining. Bores in the seat/strut tube are sized for close fitting with the blocks. A high strength industrial adhesive may be used in place of or in addition to screws.

Figure 22:
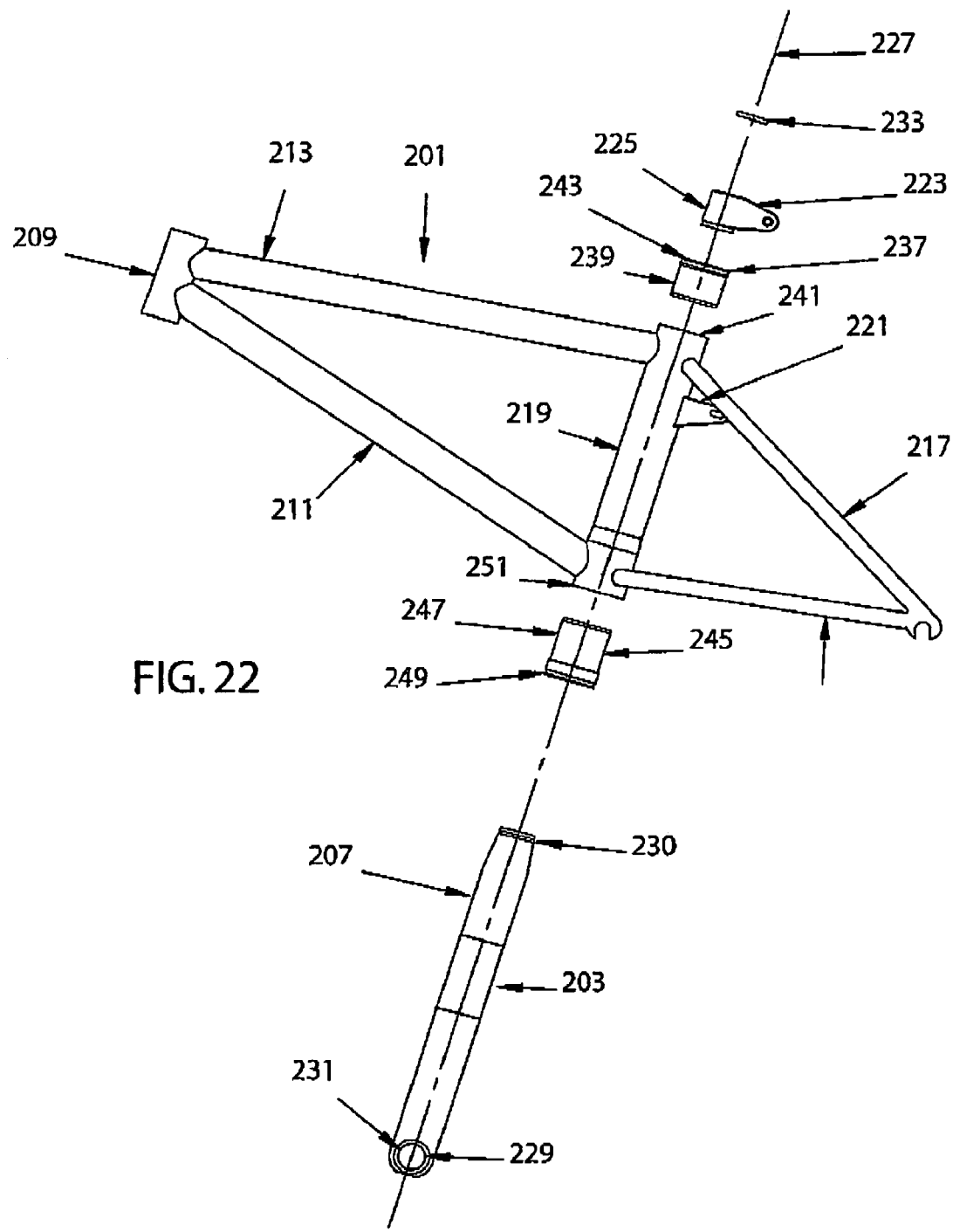
FIG. 22 shows the elongated strut for a bicycle frame with bearing inserts.

FIG. 22 shows an embodiment with the elongated strut base 207 on a bicycle frame with bearing inserts, similar to the embodiment of FIG. 1. A top bearing 237 has a throat 239 which fits inside an upper end 241 of the seat/strut tube 219, and a flange 243 that rests on the top of the seat/strut tube 219. A base bearing 245 has a throat 247 which fits inside the lower end 251 of seat/strut tube 219, and a flange 249 that abuts the lower end of the seat/strut tube 219. The bearings are press fit and/or bonded to the seat/strut tube with industrial adhesive and/or are attached with screws.

Figure 23:
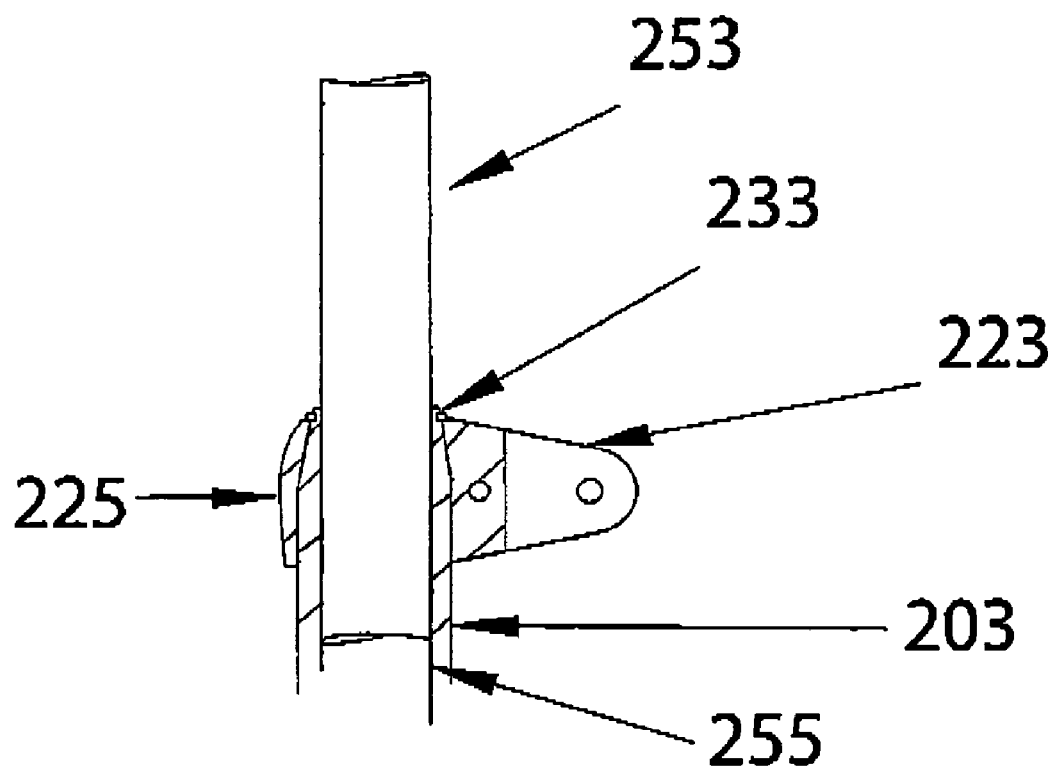
FIG. 23 is a detail side cross-sectional view of a strut top with a seat post and clamp.

FIG. 23 is a detail side view of a top of a strut 203 with a seat post 253 and clamp 225. A seat post bore 255 in the strut top holds the seat post 253. Snap ring 233 acts as a fail-safe travel stop for clamp 225.

Figure 24:
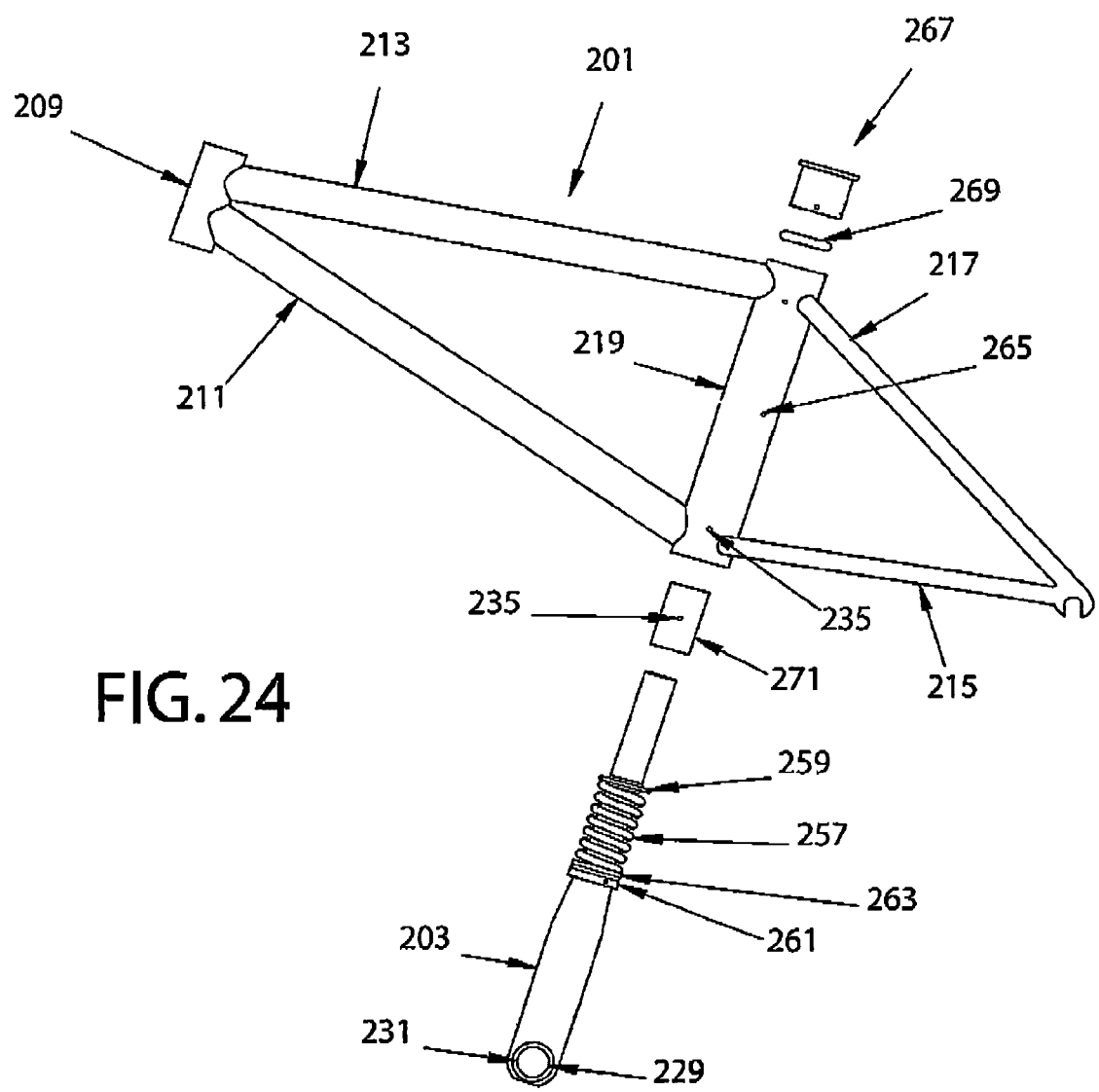
FIG. 24 is an exploded view of a bicycle frame and strut with an internal spring.

FIG. 24 is an exploded view of a bicycle frame 201 and strut 203 with a spring 257. This two-part assembly has an upper spring seat 259 machined as an integral part of the strut tube 203, which in turn captivates a coil spring 257, a jounce snubber ring 263 and lower spring seat 261, slideable relative to the strut tube 203. The assembly is secured in the housing tube by means of screws in screw holes 265 through the strut tube and threaded into the lower spring seat 261. An index block 271 is located between the strut 203 and the strut tube 219. An upper bearing 267, similar to those described above, and rebound snubber ring 269 complete the suspension assembly. Note that the brackets 15, 17, 221, 223 have optionally been eliminated. This configuration is most useful where weight is not critical and the benefits of an externally mounted engineered air shock and/or coil spring are not needed.

Figure 29:
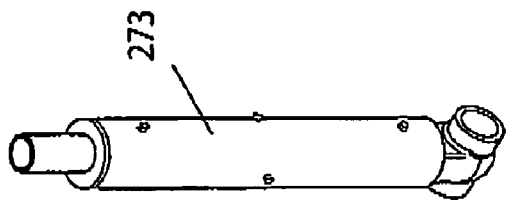
FIGS. 25-29 show various views of a housing tube and strut.
Figure 28:
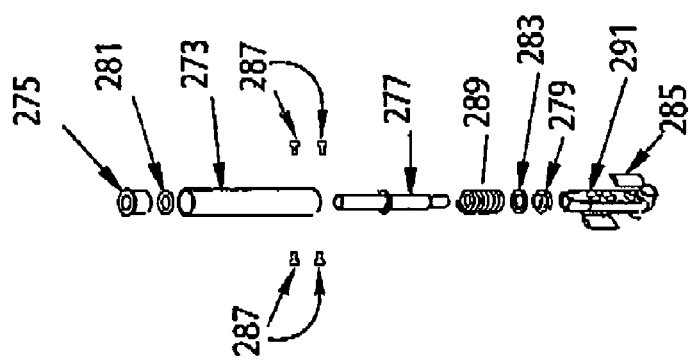
Figure 27:
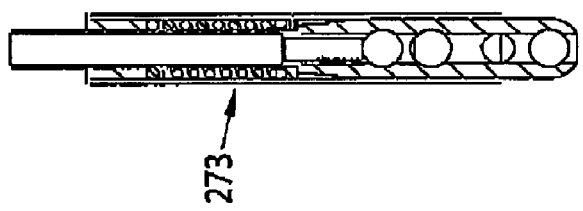
Figure 26:
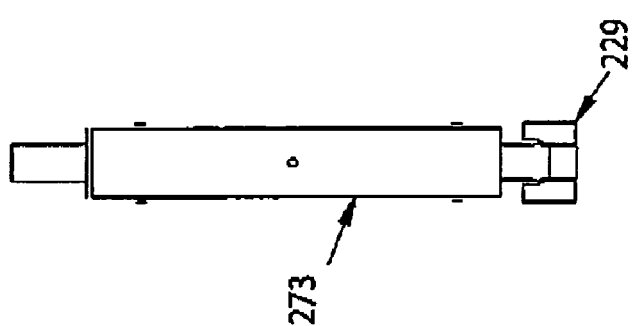
Figure 25:
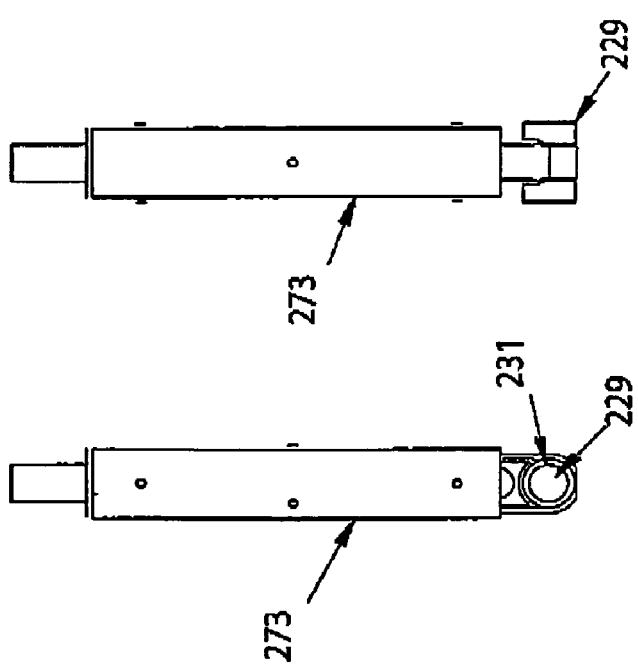

FIGS. 25-29 show various views of a strut and housing tube embodiment. FIG. 25 shows a side view of a strut housing tube 273. FIG. 26 shows a front view of a housing tube 273. FIG. 27 shows a cross-section view of a strut, spring and housing tube 273. FIG. 28 shows an exploded side view of a strut housing tube 273 and the various strut, spring and mounting parts. These parts include an upper bearing 275, an upper strut 277, a lower spring support 279, a top snubber 281, a bottom snubber 283, index blocks 285, bolts 287, a spring 289 and a short lower strut base 291. The housing tube 273 is preferably first welded into a bicycle frame as the seat/strut tube 11, 219. The spring 289, bottom snubber 283, and lower spring support 279 are placed on the upper strut 277 before the upper strut is fixed in the lower strut base 291. The assembled strut is placed in the housing 273, and the index blocks 285 and upper bearing 275 are secured at opposite ends of the housing 273. The housing, strut and components may also be pre-assembled and sold ready for use and/or installation. FIG. 29 shows a perspective view of the strut and housing tube 273 with the various parts and components installed and assembled therewith.

Figure 34:
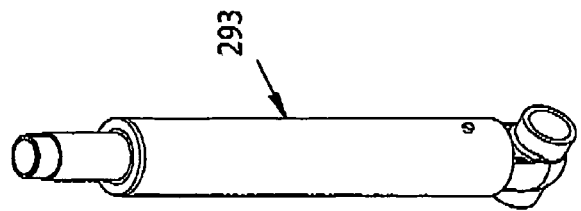
FIGS. 30-34 shows various views of another housing tube and strut.
Figure 33:
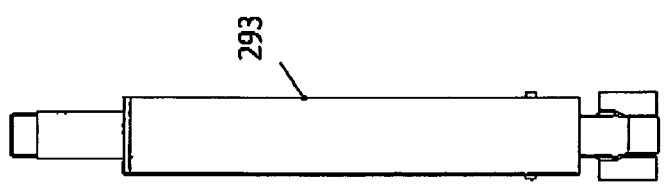
Figure 32:
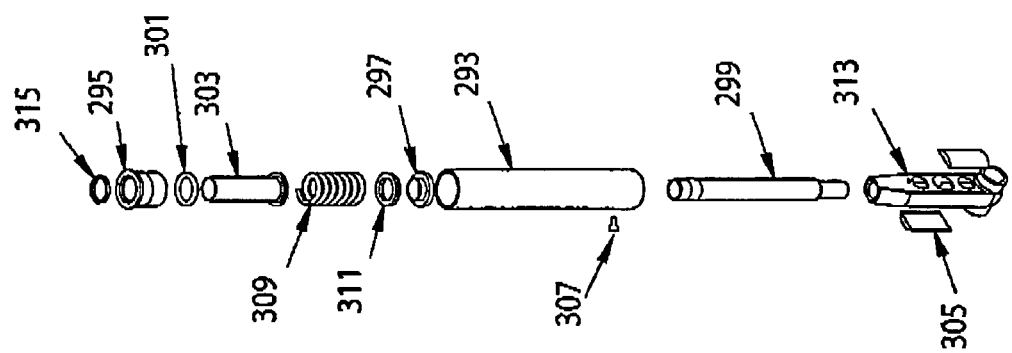
Figure 31:
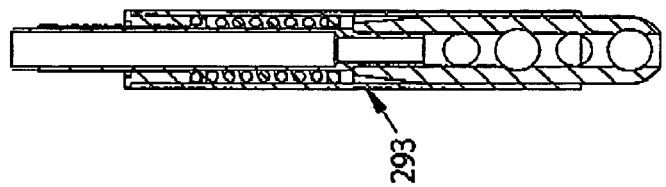
Figure 30:
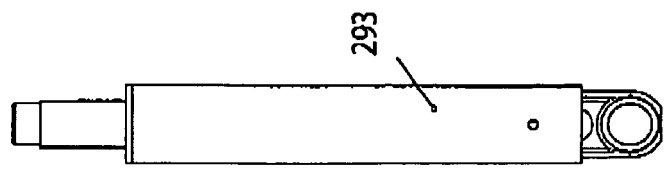

FIGS. 30-34 show various views of another housing tube embodiment 293, a spring preload adjustable (load adjustable) variation of the configuration shown in FIGS. 25-29, where the upper spring seat has a threaded portion that engages like threads on the strut tubes. The upper bearing 295 is threaded and engages like threads in the top bore of the housing tube 293. This embodiment addresses problems of adjustability and serviceability. FIG. 30 shows a side view of a strut and housing tube 293. FIG. 31 shows a front view of the strut and housing tube 293. FIG. 32 shows a cross-section view of the strut, spring and housing tube 293 and the various parts assembled therein. FIG. 33 shows an exploded view of the strut, spring and housing tube 293 and the various related parts. The various parts include an upper bearing 295, a lower spring support 297, an upper strut 299, a top snubber 301, an adjusting tube 303, index blocks 305, bolts 307, a spring 309, a bottom snubber 311, a short lower strut 313 and a wiper seal 315. FIG. 34 shows a perspective view of the strut and housing tube 293 with the various parts and components installed and assembled therewith.

A new approach permits the use of standard frame welding practice without the need for extraordinary fixtures or procedures. Options are provided in component material selection and suspension configuration which have previously been limited because of the heat of welding. This frame integral technology may be used with only minor changes to current fabrication practices.

An inner strut assembly is provided that requires no welding. Bearing inserts or index blocks may be secured in a completed bike frame with conventional fastening means, for example, screws. In one embodiment, a lower spring seat may be secured with a snap ring and heat sensitive materials may be used.

Present prototype frame integral bicycles may embody all improvements in a form that is relatively easy and cost effective to manufacture.

This bicycle frame suspension approach provides for a range of material selections to optimize performance of the suspension and otherwise permits use of this technology with minimal changes in present manufacturing procedures.

In the strut tube, the insert construction solves some problems while adding only a little to the tube diameter and very little weight, and requiring machining only after frame fabrication and heat treatment. The tube may be machined from high quality tubing stock or form extruded. The seat/strut housing tube encloses a spring and/or has an air spring shock absorber bracket. For the frame builder, the addition of the bracket is no problem. The remainder of the frame construction follows standard practice.

Top and base bearing inserts are secured in the strut housing frame seat/strut tube after frame welding and machining (bores in the seat/strut tube are sized for close fit with the bearings). A high strength industrial adhesive or screws may be used to affix bearings in the frame seat/strut tube. Boots, snap rings, and an air spring or spring are added when inserting the strut in the strut housing frame seat/strut tube.

The strut upper tube is preferably press-fit, bonded, pinned, and/or threaded in the lower strut. The lower strut has a concentric, flatted round cross-section to facilitate machining and alignment with mating parts.

The lower and upper bearing guide the strut in reciprocation. The lower base bearing guides and restricts the lower strut to axial reciprocation within the strut housing frame seat/strut tube. The top bearing guides and restricts the strut upper tube to axial reciprocation within the strut housing frame seat/strut tube.

The bicycle frame may have top and down tubes or a single tube between the fork tube and the seat/strut tube.

While the invention has been described with reference to specific embodiments, modifications and variations of the invention may be constructed without departing from the scope of the invention. Therefore, the scope of the present invention is to be determined from a reading of the claims below.

We claim:

1. A suspension system for a vehicle having a frame with a suspension housing tube, the suspension housing tube having an upper section and a lower section, the suspension system comprising:
    a top bearing having a throat fitting at least partially within the upper section of the suspension housing tube, the top bearing being secured to the suspension housing tube;
    a base bearing having a throat fitting at least partially within the lower section of the suspension housing tube, the base bearing being secured to the suspension housing tube;
    a strut having a lower section and an upper section, the strut sliding axially within the suspension housing tube,
    the lower section of the strut generally being an elongate tube having a lower end and an upper end, having an opening at the lower end to receive an axle for the vehicle, and the upper end of the lower section tapering inwardly, the lower section sliding axially within the base bearing, and
    the upper section of the strut generally being an elongate tube having a lower end and an upper end, the upper section sliding axially within the top bearing; and
    a retainer secured to the upper end of the upper section of the strut to prevent the strut from withdrawing from the suspension housing tube.

2. A suspension system for a vehicle having a frame with a suspension housing tube, the suspension housing tube having an upper section and a lower section, the suspension system comprising:
    a top bearing having a throat fitting at least partially within the upper section of the suspension housing tube, the top bearing being secured to the suspension housing tube;
    a base bearing having a throat fitting at least partially within the lower section of the suspension housing tube, the base bearing being secured to the suspension housing tube;
    a strut having a lower section and an upper section, the strut sliding axially within the suspension housing tube,
    the lower section of the strut generally being an elongate tube having a lower end and an upper end, having an opening at the lower end to receive an axle for the vehicle, and the upper end of the lower section tapering inwardly, the lower section sliding axially within the base bearing, and
    the upper section of the strut generally being an elongate tube having a lower end and an upper end, the upper section sliding axially within the top bearing; and
    a retainer secured to the upper end of the upper section of the strut to prevent the strut from withdrawing from the suspension housing tube,
    wherein at least part of the lower section of the strut has a rounded cross section flattened on at least one side, and wherein the base bearing has at least one index block having a generally flat face, the flat face of the index block cooperating with the flattened side of the strut to maintain the strut in alignment with the suspension housing tube.

3. The suspension system of claim 2 wherein at least part of the lower section of the strut has a rounded cross section flattened on two opposing sides, and wherein the base bearing has a pair of index blocks, each index block having a generally flat face, the flat faces of the pair of index blocks cooperating with the flattened opposing sides of the strut to maintain the strut in alignment with the suspension housing tube.

4. The suspension system of claim 1 wherein the retainer comprises a clamp.

5. The suspension system of claim 1 wherein the retainer comprises a snap ring.

6. The suspension system of claim 2 wherein the upper end of the upper section of the strut has a groove therein, and wherein the retainer comprises a snap ring fitting at least partially within the groove.

7. The suspension system of claim 2 wherein the upper end of the upper section of the strut has a groove therein, and wherein the retainer comprises a clamp and a snap ring, the snap-ring fitting at least partially within the groove, the clamp being on the upper end of the strut and between the upper section of the suspension housing tube and the snap ring.

8. The suspension system of claim 2 wherein the vehicle has a frame which has a bracket to allow attachment of one end of at least one of a spring or shock absorber, and wherein the retainer comprises a bracket to allow attachment of another end of the at least one spring or shock absorber.

9. The suspension system of claim 1 wherein the vehicle is a bicycle having a gear and chain links, and the base bearing has a recessed area on an external surface to provide clearance for at least one of the gear and the chain links.

10. The suspension system of claim 2 wherein the lower end of the upper section of the strut is smaller than, and fits at least partially within, the upper end of the lower section of the strut, and wherein the upper section of the strut is secured to the lower section of the strut.

11. The suspension system of claim 2 wherein the upper section of the strut and the lower section of the strut are distinct components, and wherein the upper section has threads on the lower end thereof, and wherein the lower section has a threaded socket on the upper end thereof for receiving the threads of the lower end of the upper section.

12. A suspension system for a vehicle having a suspension housing tube, the suspension housing tube having an upper section and a lower section, the suspension system comprising:
    a top bearing having a throat, the throat fitting at least partially within the upper section of the suspension housing tube, the top bearing being secured to the suspension housing tube;
    a spring;
    a strut having a lower section and an upper section, the strut sliding axially within the suspension housing tube, the lower section of the strut generally being an elongate tube having a lower end and an upper end, and having an opening at the lower end to receive an axle for the vehicle, at least part of the lower section of the strut having a rounded cross section flattened on at least one side, the upper end of the lower section tapering inwardly, and
    the upper section of the strut generally being an elongate tube having a lower end and an upper end, the upper section having a fixed upper spring seat, at least part of the upper section being axially within the spring, the upper section sliding axially within the top bearing,
    a lower spring seat adapted to be secured to the suspension housing tube, the lower end of the upper section of the strut sliding axially within the lower spring seat, the spring being secured by the upper spring seat and the lower spring seat;
    an index block having a generally flat face, the flat face of the index block cooperating with the flattened side of the strut to maintain the strut in alignment with the suspension housing tube; and
    a retainer to prevent the strut from withdrawing from the suspension housing tube.

13. The suspension system of claim 12 wherein the at least part of the lower section of the strut has a rounded cross section flattened on two opposing sides, and wherein there is a pair of index blocks, each index block having a generally flat face, the flat faces of the pair of index blocks cooperating with the flattened opposing sides of the strut to maintain the strut in alignment with the suspension housing tube.

14. The suspension system of claim 12 wherein the retainer secures the lower spring seat to the suspension housing tube.

15. The suspension system of claim 12 wherein the suspension housing tube has a hole therein, and wherein the retainer comprises a screw threaded through the hole in the suspension housing tube and into the lower spring seat.

16. The suspension system of claim 12 wherein the lower spring seat has a hole therein, wherein the suspension housing tube has a hole therein, and wherein the retainer comprises a screw threaded through the hole in the suspension housing tube and into the hole in the lower spring seat.

17. The suspension system of claim 12 and further comprising a jounce ring positioned between the lower spring seat and the spring.

18. The suspension system of claim 12 wherein the top bearing has a flange, and further comprising a rebound ring positioned between the upper end of the suspension housing tube and the flange of the top bearing.

19. The suspension system of claim 12 wherein the upper section of the strut and the lower section of the strut are distinct components, and wherein the upper section has threads on the lower end thereof, and wherein the lower section has a threaded socket on the upper end thereof for receiving the threads of the lower end of the upper section.

20. A suspension assembly comprising:
    a suspension housing tube having an upper section and a lower section;
    a top bearing having a throat fitting at least partially within the upper section of the suspension housing tube, the top bearing being secured to the suspension housing tube;
    a spring;
    a strut having a lower section and an upper section, at least part of the strut sliding axially within the suspension housing tube,
    the lower section of the strut generally being an elongate tube having a lower end and an upper end, and having an opening at the lower end to receive an axle for the vehicle, at least part of the lower section of the strut having a rounded cross section flattened on at least one side, the upper end of the lower section tapering inwardly, and at least part of the lower section sliding axially within the base bearing,
    the upper section of the strut generally being an elongate tube having a lower end and an upper end, the upper section having a fixed upper spring seat, at least part of the upper section being axially within the spring, at least part of the upper section sliding axially within the top bearing, a lower spring seat secured to the suspension housing tube, the lower end of the upper section of the strut sliding axially within the lower spring seat, the spring being secured by the upper spring seat and the lower spring seat;

an index block having a generally flat face, the flat face of the index block cooperating with the flattened side of the strut to maintain the strut in alignment with the suspension housing tube; and a retainer to prevent the strut from withdrawing from the suspension housing tube.

* * * * *